(12) United States Patent
Baaijens

(10) Patent No.: US 8,084,958 B2
(45) Date of Patent: Dec. 27, 2011

(54) DEVICE FOR GENERATING LIGHT WITH A VARIABLE COLOR

(75) Inventor: Johannes Petrus Wilhelmus Baaijens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 443 days.

(21) Appl. No.: 12/301,297

(22) PCT Filed: Jun. 7, 2007

(86) PCT No.: PCT/IB2007/052146
§ 371 (c)(1),
(2), (4) Date: Nov. 18, 2008

(87) PCT Pub. No.: WO2007/141748
PCT Pub. Date: Dec. 13, 2007

(65) Prior Publication Data
US 2009/0315476 A1    Dec. 24, 2009

(30) Foreign Application Priority Data

Jun. 8, 2006 (EP) .................................... 06115120

(51) Int. Cl.
*H05B 41/36* (2006.01)
(52) U.S. Cl. ........ 315/291; 315/308; 315/312; 315/360; 345/590; 345/591; 345/592; 345/593; 345/597

(58) Field of Classification Search .................. 315/291, 315/294, 297, 307, 308, 312, 316, 360; 345/22, 345/76, 150, 82, 83, 590–599
See application file for complete search history.

(56) References Cited

U.S. PATENT DOCUMENTS

| | | | | |
|---|---|---|---|---|
| 5,254,977 A * | 10/1993 | MacDonald | | 345/591 |
| 5,299,291 A * | 3/1994 | Ruetz | | 358/1.9 |
| 5,334,992 A * | 8/1994 | Rochat et al. | | 345/22 |
| 5,384,519 A * | 1/1995 | Gotoh | | 315/324 |
| 5,991,511 A * | 11/1999 | Granger | | 358/1.9 |
| 2005/0146734 A1 * | 7/2005 | Stokes et al. | | 358/1.9 |

* cited by examiner

*Primary Examiner* — Douglas W Owens
*Assistant Examiner* — Thai Pham

(57) ABSTRACT

Disclosed is an illumination system that includes a lamp assembly, a controller, a user input device, and a memory defining discrete color points and containing a ID hue table, a ID saturation table, a ID brightness table, and a boundary memory defining a boundary of the color space. On the basis of data received from the user input device and on the basis of the information in the memory, the controller generates color control signals for the lamp assembly. The controller compares the user input data with the information in the boundary memory. If the controller finds that said point is located outside the boundary of the color space, the controller calculates a replacement point on the color space boundary as defined in the boundary memory, and generates its control signals on the basis of the replacement point.

3 Claims, 3 Drawing Sheets

DEVICE FOR GENERATING LIGHT WITH A VARIABLE COLOR

This application is a national stage application under 35 U.S.C. §371 of International Application No. PCT/IB2007/052146 filed on Jun. 7, 2007, and published in the English language on Dec. 13, 2007 as International Publication No. WO/2007/141748, which claims priority to European Application No. 06115120.5, filed on Jun. 8, 2006, incorporated herein by reference.

FIELD OF THE INVENTION

The present invention relates in general to the field of lighting. More particularly, the present invention relates to an illumination device for generating light with a variable color.

BACKGROUND OF THE INVENTION

Illumination systems for illuminating a space with a variable color are generally known. Generally, such systems comprise a plurality of light sources, each light source emitting light with a specific color, the respective colors of the different light sources being mutually different. The overall light generated by the system as a whole is then a mixture of the light emitted by the several light sources. By changing the relative intensities of the different light sources, the color of the overall light mixture can be changed.

It is noted that the light sources can be of different type, such as for instance TL lamp, halogen lamp, LED, etc. In the following, simply the word "lamp" will be used, but this is not intended to exclude LEDs.

By way of an example of a variable color illumination system, an illumination system in a theatre is mentioned. During a show, it may be desirable to change the color of the lighting. However, also in the case of homes, shops, restaurants, hotels, schools, hospitals, etc., it may be desirable to be able to change the color of the lighting. In the case of a theatre or the like, the colors are typically changed with a view to enhance dramatic effects, but in other situations it may be more desirable to have smooth and slow transitions.

As should be clear to a person skilled in the art, the color of light can be represented by coordinates of a color point in a color space. In such representation, changing a color corresponds to a displacement from one color point to another color point in the color space, or a displacement of the setting of the color point of the system. Further, a sequence of colors corresponds to a collection of color points in the color space, which collection will be indicated as a path. Dynamically changing the colors can then be indicated as "traveling" such path. More in general, dynamically changing the colors of lighting will be indicated as "navigating" through the color space.

Typically, an illumination system comprises three lamps. Usually, these lamps are close-to-red (R), close-to-green (G), close-to-blue (B), and the system is indicated as an RGB system. For each lamp, the light intensity can be represented as a number from 0 (no light) to 1 (maximum intensity). A color point can be represented by three-dimensional coordinates ($\xi 1$, $\xi 2$, $\xi 3$), each coordinate in a range from 0 to 1 corresponding in a linear manner to the relative intensity of one of the lamps. The color points of the individual lamps can be represented as (1,0,0), (0,1,0), (0,0,1), respectively. These points describe a triangle in the color space. All colors within this triangle can be generated by the system.

In theory, the color space can be considered as being a continuum. In practice, however, a controller of an illumination system is a digital controller, capable of generating discrete control signals only. When a user wishes to navigate through the color space with a system comprising such digital controller, he can only take discrete steps in the direction of one of the coordinates. A problem is that the RGB color space is not a linear space, so that, when taking a discrete step of a certain size along one of the color intensity coordinate axes, the amount of color change perceived by the user is not constant but depends on the actual position within the color space.

In order to solve this problem, different representations of the color space have been proposed, such as the CIELAB color space, where the independent variables are hue (H), saturation (S; in CIELAB calculated with S=Chroma/Lightness), brightness (B; in CIELAB calculated from Lightness). Because of the perceptual uniformity of Lightness (i.e. a linear change of Lightness level is also perceived as a linear change of light intensity level by the user), it is advantageous to use this parameter instead of Brightness. However, to generalize the description the parameter "Brightness" will be used in the explanation next, which values are also described with a perceptual uniform distribution (e.g. in u'v'Y space, with "Y" describing intensity, perceptual uniform Brightness distribution is logarithm (Y)). The CIELAB color space can be seen as a three-dimensional space of discrete points (3D grid). Each point in this space can be represented by coordinates m, n, p, and in each point the hue (H), saturation (S), Brightness (B) have specific values H(m,n,p), S(m,n,p), B(m,n,p), respectively. A user can take a discrete step along any of the three coordinate axes, resulting in predefined and constant changes in hue, saturation or Brightness, respectively, as long as the color is inside the outer boundary of the color space (color gamut). In principle, the variables hue, saturation and Brightness are independent from each other. However, not all combinations of possible values for hue, saturation and Brightness correspond to physically possible colors. In a state of the art implementation, the system comprises three 3D lookup tables for hue, saturation and Brightness, respectively. With such 3D lookup tables, an advantage is that it is easily possible to consider, for each combination of m, n, and p, whether or not the resulting combination of H, S and B corresponds to a physically possible color, and to enter a deviating value in the tables if necessary. For memory locations where the combination of H, S and B would result in physically impossible colors, the tables may contain a specific code, or they may contain values of a different color, for instance the closest value of the color space boundary.

A problem, however, is that such solution with 3D lookup tables requires a relatively large amount of memory space. In an exemplary situation, the system allows for independent setting of the brightness in 25 possible brightness levels, the saturation in 75 possible saturation levels, and the hue in 200 possible hue values. In such situation, the system requires 3*200*75*25=1125000 memory locations (over 1 MByte).

The invention aims to reduce the amount of memory space needed, so that low cost microcontrollers with limited memory space can be used. A further objective of the invention is to provide a more efficient manner of storing color values of an (H,S,B) table, allowing for a simple navigation method through the (H,S,B) table along lines of constant Hue, Saturation or Brightness.

SUMMARY OF THE INVENTION

According to an important aspect of the present invention, the CIELAB color table is stored in a more efficient manner, reducing the required memory space significantly. More particularly, one-dimensional independent arrays are used for hue, saturation and brightness. Further, additional independent arrays are used for defining valid combinations of H, S and B. In the above exemplary situation, the same functionality can be achieved with less than 36000 memory locations, which means a reduction of the required memory size by a factor of more than 30.

BRIEF DESCRIPTION OF THE DRAWINGS

These and other aspects, features and advantages of the present invention will be further explained by the following description with reference to the drawings, in which same reference numerals indicate same or similar parts, and in which.

DETAILED DESCRIPTION OF THE INVENTION

Figure 1:
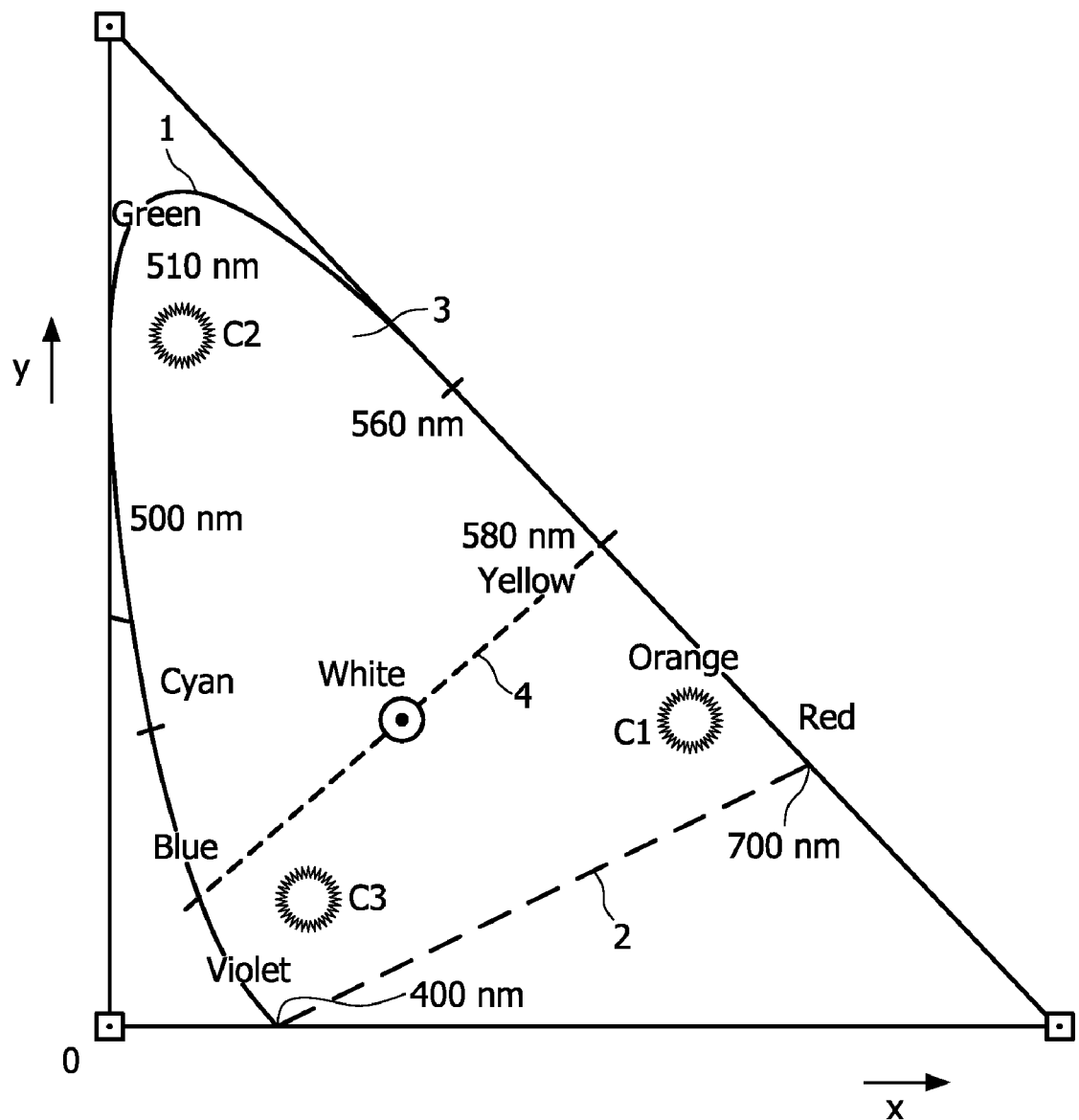
FIG. 1 schematically shows a chromaticity diagram.

FIG. 1 schematically shows an CIE(xy) chromaticity diagram. This diagram is well-known, therefore an explanation will be kept to a minimum. Points (1,0), (0,0), and (0,1) indicate ideal red, blue and green, respectively, which are virtual colors. The curved line 1 represents the pure spectral colors. Wavelengths are indicated in nanometers (nm). A dashed line 2 connects the ends of the curved line 1. The area 3 enclosed by the curved line 1 and dashed line 2 contains all visible colors; in contrast to the pure spectral colors of the curved line 1, the colors of the area 3 are mixed colors, which can be obtained by mixing two or more pure spectral colors. Conversely, each visible color can be represented by coordinates in the chromaticity diagram; a point in the chromaticity diagram will be indicated as a "color point".

It is noted that a different graphical color representation, for instance the RGB diagram, may also be used, as should be clear to a person skilled in this art. However, the distribution of colors in the RGB space is completely device dependent (e.g. a certain RGB value will in general give different perceived colors with different lamps that each have different RGB primary colors).

Preferably, the colors are represented in a device independent color space, like the CIELAB color space, also referred to as the L*a*b* color space. The CIELAB space is preferred due to its perceptual uniformity. Since the color definitions associated with these color spaces are known to persons skilled in this art, an extensive explanation will be omitted here. It suffices to mention that these spaces have hue (this will be explained hereinafter), saturation (this will be explained hereinafter), and brightness (a measure for the overall light intensity) as independent variables, and that a color representation in RGB space can be converted to a color representation in CIELAB color space, or vice versa, via one-to-one matrix transformations.

The basic concepts of Hue, Saturation and Brightness are most easily explained in the CIE 1931 (x,y) color space, although in other color space other definitions can be obtained. For simplicity, we use CIE 1931 (x,y) color space next.

When two pure spectral colors are mixed, the color point of the resulting mixed color is located on a line connecting the color points of the two pure colors, the exact location of the resulting color point depending on the mixing ratio (intensity ratio). For instance, when violet and red are mixed, the color point of the resulting mixed color purple is located on the dashed line 2. Two colors are called "complementary colors" if they can mix to produce white light. For instance, FIG. 1 shows a line 4 connecting blue (480 nm) and yellow (580 nm), which line crosses a white point, indicating that a correct intensity ratio of blue light and yellow light will be perceived as white light. The same would apply for any other set of complementary colors: in the case of the corresponding correct intensity ratio, the light mixture will be perceived as white light. It is noted that the light mixture actually still contains two spectral contributions at different wavelengths.

If the light intensity of two complementary colors (lamps) is indicated as I1 and I2, respectively, the overall intensity Itot of the mixed light will be defined by I1+I2, while the resulting color will be defined by the ratio I1/I2. For instance, assume that the first color is blue at intensity I1 and the second color is yellow at intensity I2. If I2=0, the resulting color is pure blue, and the resulting color point is located on the curved line 1. If I2 is increased, the color point travels the line 4 towards the white point. As long as the color point is located between pure blue and white, the corresponding color is still perceived as blue-ish, but closer to the white point the resulting color would be paler.

In the following, the word "color" will be used for the actual color in the area 3, in association with the phrase "color point". The "impression" of a color will be indicated by the word "hue"; in the above example, the hue would be blue. It is noted that the hue is associated with the spectral colors of the curved line 1; for each color point, the corresponding hue can be found by projecting this color point onto the curved line 1 along a line crossing the white point.

Further, the fact whether a color is a more or less pale hue will be expressed by the phrase "saturation". If a color point is located on the curve 1, the corresponding color is a pure spectral color, also indicated as a fully saturated hue (saturation=1). As the color point travels towards the white point, the saturation decreases (less saturated hue or paler hue); in the white point, the saturation is zero, per definition.

It is noted that many visible colors can be obtained by mixing two colors, but this does not apply for all colors, as can easily be seen from FIG. 1. In order to be able to produce light having any desired color, three lamps producing three different colors are needed. More lamps may be used, but that is not necessary.

Figure 2:
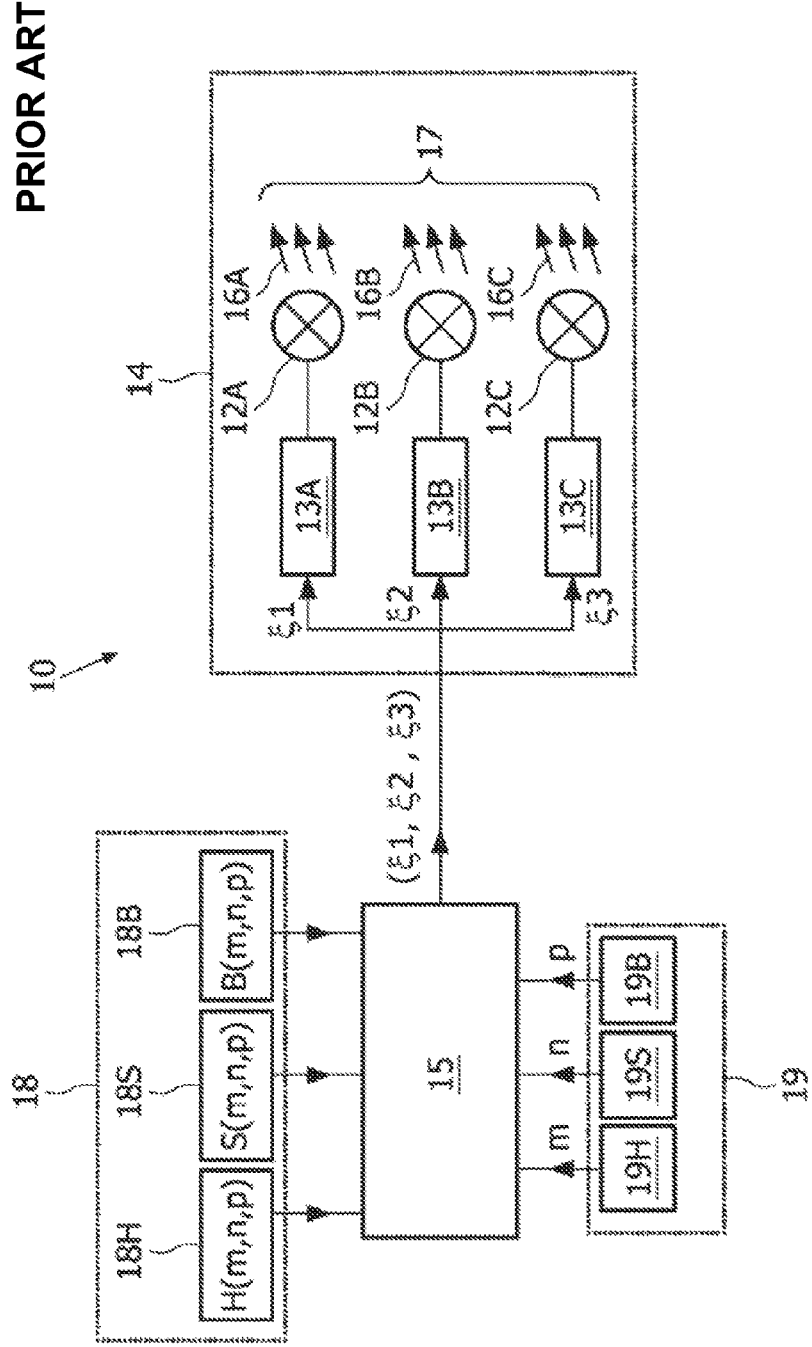
FIG. 2 schematically shows a block diagram of an illumination system according to prior art, FIG. 3 schematically shows a block diagram of an illumination system according to the present invention.

FIG. 2 schematically shows a block diagram of an illumination system 10, comprising a lamp assembly 14. The lamp assembly 14 comprises a plurality (here: three) of lamps 12A, 12B, 12C, each with an associated lamp driver 13A, 13B, 13C, respectively, controlled by a common controller 15. A user input device is indicated at 19. The three lamps 12A, 12B, 12C generate light 16A, 16B, 16C, respectively, with mutually different light colors; typical colors used are red (R), green (G), blue (B). Instead of pure red, green and blue, the lamps will typically emit light close-to-red, close-to-green and close-to-blue, as indicated by three exemplary color points C1, C2, C3 in FIG. 1, respectively. The overall light emitted by the lamp assembly 14 is indicated at 17; this overall light 17, which is a mixture of individual lights 16A, 16B, 16C, has a color point within the triangle defined by corner points C1, C2, C3. With the system 10, it is possible to set the mixture color of the output light mixture 17 at any desired location within said triangle, if it is possible to change the light intensities of the individual lamps 12A, 12B, 12C continuously. Typically, however, the controller 15 is a digital controller, and the light intensities of the individual lamps 12A, 12B, 12C can only be changed with discrete steps. In such case, the attainable color points are located along a grid in the color space. If the grid is sufficiently fine-mazed, the discrete nature of the steps from one point to a neighboring point is not visible to the human eye. As regards color representation, CIELAB color space is preferred, because the distance between two neighboring grid points corresponds to substantially equal differences in perceived color over the entire CIELAB color space.

In the CIELAB color space, the hue, saturation and brightness can be varied independently from each other, as long as the color is inside the color space boundary. In the present invention, we use linear axes for Hue, Saturation and Brightness; these linear axes span the color space with cylindrical coordinates. Further, each axis is discretized, i.e. it is only possible to take discrete steps along each axis. Those steps are chosen such that color steps (in CIELAB described with e.g. color difference value $\Delta E$) along each axis are perceptual uniform. Each color in such discretized color space is described by a combination of values along each of the three axes Hue, Saturation and Brightness. Navigation through the colors that are generated in this way results in approximately perceptual equidistant color steps along lines of constant Hue, Saturation and Brightness as long as the colors are inside the color space boundary.

Particularly, the brightness B can be varied from a minimum value Bmin (usually taken larger than zero) to a maximum value Bmax in equidistant steps. The number of possible brightness levels will be indicated by $N_B$. The size of the said perceptual equidistant steps will be indicated by $\Delta B$. Then, using a "brightness index" p, the $N_B$ possible values of brightness B(p) can be expressed according to the following formula:

$$B(p) = B\min + p^* \Delta B \quad (1)$$

wherein index p is an integer from 0 to $N_B-1$.

It can easily be seen that $\Delta B = (B\max - B\min)/(N_B-1)$. When using CIELAB space, "Lightness" is used instead of "Brightness"; a linear increase of Lightness is also perceived by human observers as a linear increase of brightness. To obtain such distribution in other color spaces, B should be defined as logarithm (intensity) with intensity in [lux] or logarithm (flux) with flux in [lumen].

Likewise, the saturation S can be varied from a minimum value S min (usually equal to zero) to a maximum value Smax (usually equal to one) in equidistant steps. The number of possible brightness levels will be indicated by $N_S$. The size of the said equidistant steps will be indicated by $\Delta S$. Then, using a "saturation index" n, the $N_S$ possible values of saturation S(n) can be expressed according to the following formula:

$$S(n) = S\min + n^* \Delta S \quad (2)$$

wherein index n is an integer from 0 to $N_S-1$.

It can easily be seen that $\Delta S = (S\max - S\min)/(N_S-1)$.

Likewise, the hue H can be varied from a suitably chosen minimum value Hmin to a suitably chosen maximum value Hmax in equidistant steps. The number of possible brightness levels will be indicated by $N_H$. The size of the said equidistant steps will be indicated by $\Delta H$. Then, using a "hue index" m, the $N_H$ possible values of hue H(m) can be expressed according to the following formula:

$$H(m) = H\min + m^* \Delta H \quad (3)$$

wherein index m is an integer from 0 to $N_H-1$.

It can easily be seen that $\Delta H = (H\max - H\min)/(N_H-1)$. In CIELAB, the metric Hue difference is used for $\Delta H$, defined along a hue circle around the color space boundary with:

$$\Delta H = \overline{C}^* \Delta h^*$$

with $\overline{C}^*$ being the arithmetic mean of the two chroma values of the two sequential colors and with $\Delta h$ the hue angle difference. (Hmax–Hmin) is the metric length of the hue circle along the color space boundary (which is calculated as the sum of all $\Delta H$ differences between sequential colors along the boundary).

From the above, it follows that points in the color space can be defined by indices m, n, p, and the color in those points can be considered as being a function of 3 independent parameters m, n, p. FIG. 2 illustrates that the user input device 19 allows the user to independently select values for m, n and p. The user input device 19 is shown as a combination of three independent input devices 19H, 19S and 19B, independently providing input values m, n, p for the controller 15. On the basis of those input values m, n, p, the controller generates a set of control signals ($\xi$1, $\xi$2, $\xi$3) for the drivers 13A, 13B, 13C of the lamp assembly 14.

The above formulas further suggest that (for instance) the hue only depends on index m and does not depend on the other indices n and p. In practice, this is only true for some of the color points. However, there are color points where the parameters m, n, p have values leading in combination to a physically impossible color.

In prior art, this problem is solved in that the controller 15 is provided with a memory 18 which contains three 3D tables, for hue, saturation and brightness, respectively. In FIG. 2, this is illustrated as a combination of three independent memories 18H, 18S, 18B, containing a 3D hue table H(m,n,p), a 3D saturation table S(m,n,p), and a 3D brightness table B(m,n,p), respectively. Assume that the user has set index m to value x1, has set index n to value x2, and has set index p to value x3, then the controller 15 takes value H(x1,x2,x3) from the hue table H(m,n,p), takes value S(x1,x2,x3) from the saturation table S(m,n,p), and takes value B(x1,x2,x3) from the brightness table B(m,n,p), and generates its control signals ($\xi$1, $\xi$2, $\xi$3) on the basis of these values. For all possible combinations of values x1,x2,x3, the tables are filled such that the combination H(x1,x2,x3), S(x1,x2,x3) and B(x1,x2,x3) always corresponds to a physically possible color. This may mean that, when two points (x1,x2,x3) and (x1,x2,x3+$\Delta$x) are compared, the hue H(x1,x2,x3) differs from the hue H(x1,x2,x3+$\Delta$x) and/or the saturation S(x1,x2,x3) differs from the saturation S(x1,x2,x3+$\Delta$x). As mentioned above, this approach involves the problem that the memory 18 requires $3*N_H*N_S*N_B$ memory locations.

Figure 3:
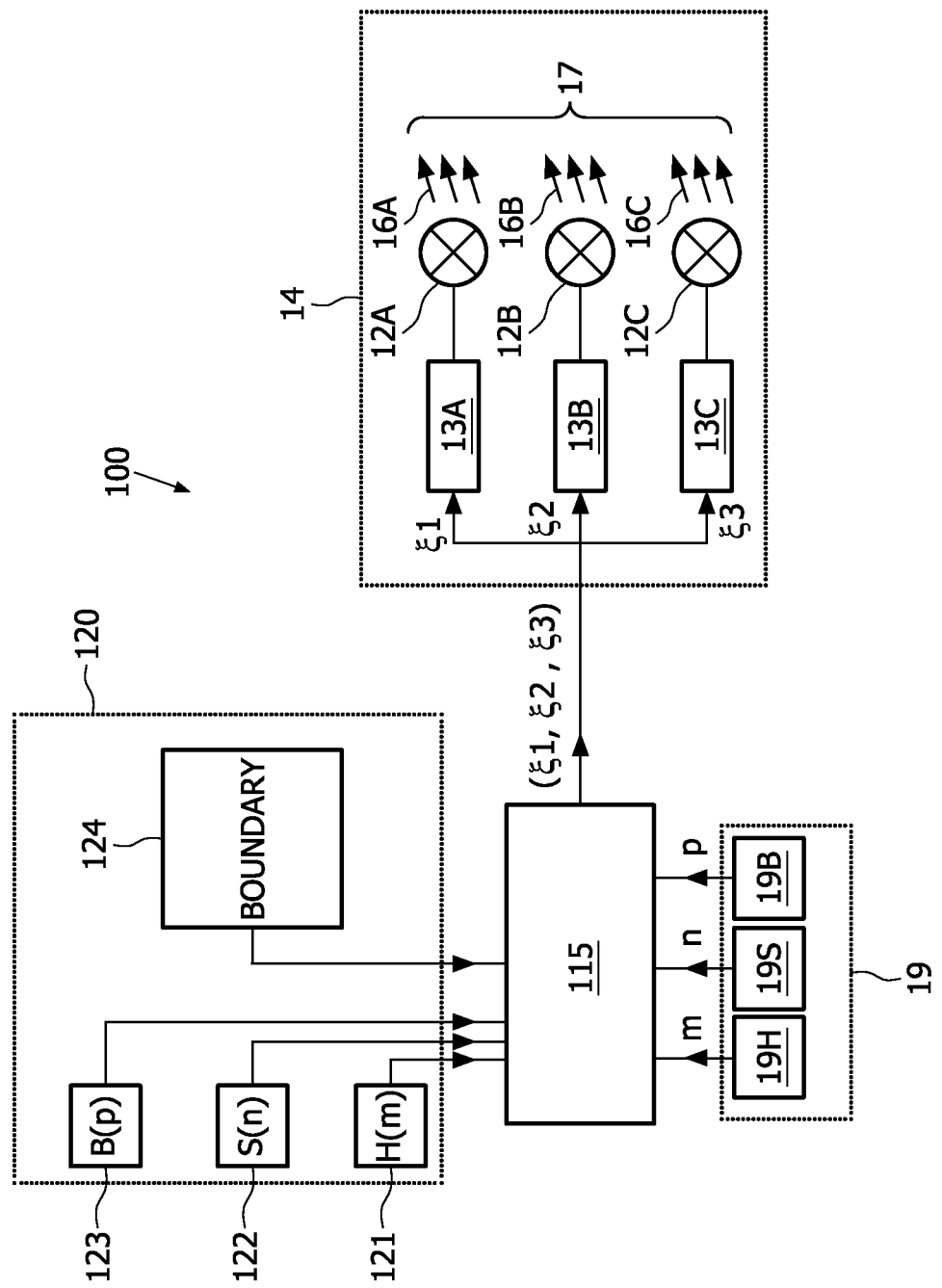

The solution proposed by the present invention is illustrated in FIG. 3, which schematically shows a block diagram like FIG. 2, of an illumination system 100 according to the present invention. Compared to the illumination system 10 of FIG. 2, the controller 15 has been replaced by a controller 115, and the memory 18 has been replaced by a memory 120. The memory 120 contains several tables. Reference numeral 121 indicates a 1D hue table containing $N_H$ hue values H(m). Reference numeral 122 indicates a 1D saturation table containing $N_S$ saturation values S(n). Reference numeral 123 indicates a 1D brightness table containing $N_B$ brightness values B(p). Together, these three tables require $N_H+N_S+N_B$ memory locations.

When the indices n and p for saturation and brightness, respectively, are kept constant, and when the hue index m is varied over the range from 0 to $N_H-1$, there may be subranges where the hue H(m) may not be taken from the 1D hue table 121 because the combination of this hue H(m) with the saturation S(n) and the brightness B(p) would lead to a physically impossible color.

According to a further aspect of the present invention, this problem is solved as follows: the boundary of physically possible colors is described at each brightness level with coordinates (Hue_bound, S_bound(Hue_bound, B_bound), B_bound). This boundary, essentially being described by S_bound that is only a function of Hue_bound and B_bound, can be stored in a memory with ($N_H*N_B$) memory locations. When the color (Hue, Saturation, Brightness) that is generated by the three linear axes is outside this boundary, the saturation S is replaced by the boundary value S_bound. This can be interpreted as a projection of (H,S,B) on the boundary along a line parallel to the S-axis.

The total memory usage is now: $(N_H+N_S+N_B)+N_H*N_B$. In the previous example with $N_H$=200, $N_S$=75, $N_B$=25 this gives (200+75+25)+(200*25)=5300 memory locations. This results in a memory reduction of a factor 212 compared with the prior art method.

A further embodiment is described as follows: in case the specified saturation S for a specified hue is larger than saturation level S_bound of the boundary at the level B_bound, but S_bound is less than the physically possible saturation at a lower (higher) Brightness level at the same Hue, the saturation and brightness value at the nearest lower (higher) brightness level of the color space boundary that is physically possible at the specified Hue can be used. The nearest point on the boundary can be found by searching the color point with maximum Brightness value on the color space boundary with saturation S and hue H. The advantage of this solution is that it enables the easy navigation towards more saturated colors. However, it can lead to more memory usage than $(N_H+N_S+N_B)+N_H*N_B$, since S_bound is no longer a single value for each pair of (Hue_bound, B_bound) parameters, but also depending on the value of the specified S itself. From practice, it can be estimated that this yields approximately $0.5*2*N_H*N_S*N_B$ memory locations for substitution. This results in a memory reduction of a factor 3 compared with the prior art method. A further reduction of the memory can be obtained by curve fitting of the boundary points (preferably linear interpolation) and storing these fits in the memory.

The two methods described here are each a complete solution to find all necessary substitutions for physically impossible colors that are generated by the three axes for Hue, Saturation and Brightness.

It should be clear that these methods provide a substantial reduction as compared to the required memory space of the prior art.

To implement any of the above-described methods, the memory 120 further comprises a boundary memory 124, containing coordinates of the boundary of the color space. When receiving a user input (x1,x2,x3), the controller 115 compares the coordinates (x1,x2,x3) with the boundary information in the boundary memory 124. If it appears that the coordinates (x1,x2,x3) define a point outside the boundary of the color space, the controller 115 calculates replacement coordinates m(x1,x2,x3), n(x1,x2,x3), p(x1,x2,x3) of a point on the boundary as defined in the boundary memory 124.

Having thus validated or amended the user-inputted indices, the controller 115 takes hue value H(x1) or H(m(x1,x2,x3)) from 1D hue table 121, takes saturation value S(x2) or S(n(x1,x2,x3)) from 1D saturation table 122, and takes brightness value B(x3) or B(p(x1,x2,x3)) from 1D brightness table 123, and generates its control signals ξ1, ξ2, ξ3 on the basis of these values.

It should be clear to a person skilled in the art that the present invention is not limited to the exemplary embodiments discussed above, but that several variations and modifications are possible within the protective scope of the invention as defined in the appending claims.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. An illumination system for generating light with a variable color within a color space, the system comprising:
   (i) a lamp assembly for generating the light;
   (ii) a controller for controlling the lamp assembly;
   (iii) a user input device coupled to the controller for receiving input data comprising a set of coordinates;
   (iv) a memory defining discrete color points and storing information comprising:
      (a) a boundary data defining a boundary of the color space;
      (b) a ID hue table containing a predetermined number (NH) of hue values (H(m)),
      (c) a ID saturation table containing a predetermined number (Ns) of saturation values (S(n)),
      (d) a ID brightness table containing a predetermined number (NB) of brightness values (B(p));
   wherein the controller is configured to (A) compare the input data with the boundary data to determine location of the color point defined by the set of coordinates in relation to the boundary of the color space and (B) generate color control signals for the lamp assembly, on the basis of at least the input data and a set of values derived from the information stored in the memory, wherein the controller is configured to obtain the set of values by taking:
      a hue value (H(xI)) from the ID hue table based on a first input coordinate (xI) of the set of coordinates,
      a saturation value (S(x2)) from the ID saturation table based on a second input coordinate (x2) of the set of coordinates,
      a brightness value (B(x3)) from the ID brightness table based on a third input coordinate (x3) of the set of coordinates, when the color point is located inside the boundary of the color space; or
   by calculating replacement coordinates of the color point on the boundary of the color space and taking:
      a hue value (H(m(xI,x2,x3))) from the ID hue table based on a first replacement coordinate (m(xI,x2,x3)),
      a saturation value (S(n(xI,x2,x3))) from the ID saturation table based on a second replacement coordinate (n(xI,x2,x3)),
      a brightness value (B(p(xI,x2,x3))) from the ID brightness table based on a third replacement coordinate (p(xI,x2,x3)), when the color point is located outside the boundary of the color space.

2. The illumination system of claim 1, wherein the controller is configured to calculate the replacement coordinates by projecting the set of coordinates on the boundary of the color space along a projection line parallel to one of the coordinate axes.

3. The illumination system of claim 1, wherein, in case the specified saturation for a specified hue is larger than a saturation level (S bound) of the boundary at a certain level (B bound), but said saturation level (S bound) of the boundary is less than the physically possible saturation at a different brightness level at the same hue, the saturation and brightness values are replaced by the saturation and brightness values at the nearest different brightness level of the color space boundary that is physically possible at the specified hue.

* * * * *